(12) United States Patent
Brown et al.

(10) Patent No.: US 6,467,734 B1
(45) Date of Patent: Oct. 22, 2002

(54) BRACKET FOR SECURING PIPES

(75) Inventors: Larry D. Brown, San Diego; James B. Schell, San Marcos, both of CA (US)

(73) Assignee: Securus, Inc., San Marcos, CA (US)

( * ) Notice: Subject to any disclaimer, the term of this patent is extended or adjusted under 35 U.S.C. 154(b) by 0 days.

(21) Appl. No.: 09/558,143

(22) Filed: Apr. 21, 2000

Related U.S. Application Data

(60) Provisional application No. 60/131,007, filed on Apr. 23, 1999.

(51) Int. Cl.$^7$ .................................................. F16L 3/08
(52) U.S. Cl. ........................................... 248/65; 248/73
(58) Field of Search ............................ 248/65, 73, 56, 248/57, 74.1, 74.5, 68.1

(56) References Cited

U.S. PATENT DOCUMENTS

| | | |
|---|---|---|
| 644,858 A | 3/1900 | Greenfield |
| 2,372,674 A | 4/1945 | Jordan |
| 3,430,662 A | 3/1969 | Guarnaschelli |
| 3,554,474 A | 1/1971 | Davies |
| 4,194,711 A | 3/1980 | Winton |
| 4,433,821 A | 2/1984 | Bolding et al. |
| 4,840,023 A | 6/1989 | Borsani |
| 5,248,119 A | 9/1993 | Imura |
| 5,839,702 A | 11/1998 | Jette |

FOREIGN PATENT DOCUMENTS

| | | | | |
|---|---|---|---|---|
| CH | 598 527 A | * | 4/1978 | ................ 248/74.1 |
| CH | 673 883 A5 | * | 4/1990 | .................. 248/65 |
| EP | 0 273 370 A1 | * | 6/1988 | ................ 248/68.1 |

* cited by examiner

*Primary Examiner*—Anita King
(74) *Attorney, Agent, or Firm*—Stetina Brunda Garred & Brucker

(57) ABSTRACT

A bracket supports tubing at a bend in the tubing. The bracket is curved, and has an open side into which the tubing is inserted into the bracket. Projecting lips or restraints extend into a portion of the opening through which the tubing is inserted, with the tubing being placed over lips to prevent the tubing from sliding out of the open side. A flange at one end of the bracket is notched to removably accept the edge of an opening in a plumbing strap, with a latch opposite the notch to releasably lock the flange to the strap. Preferably two or more spacers extend across the width of the bracket, with holes in the spacers sized to accept fasteners to nail the bracket to studs and keep the bracket from rotating about the fasteners. The spacers are a predetermined length to form spacers so that brackets can be stacked adjacent each other with the spacers abutting on another to allow the brackets to be fastened with common fasteners extending through aligned holes in the spacers to maintain the brackets at predetermined distances.

56 Claims, 6 Drawing Sheets

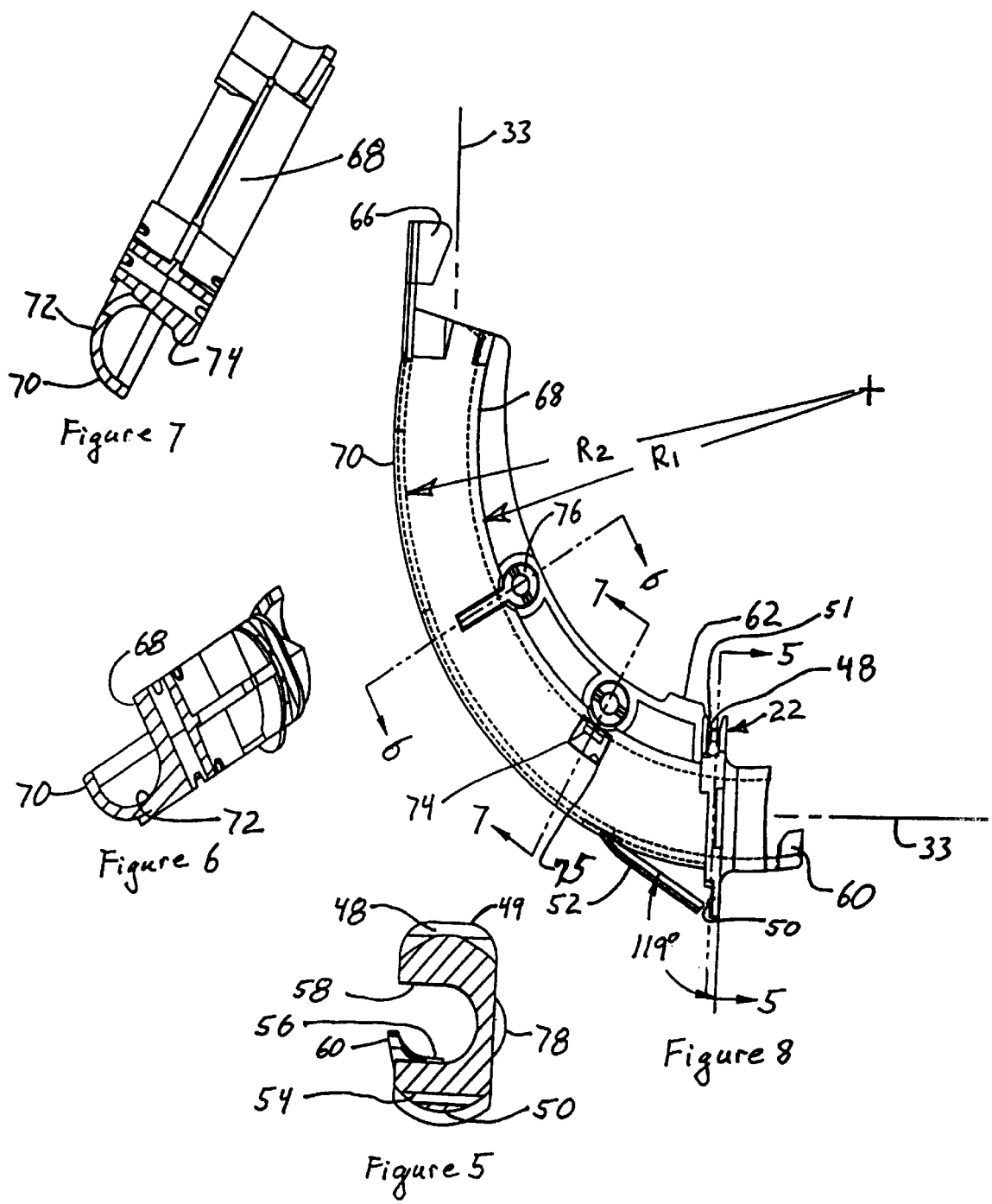

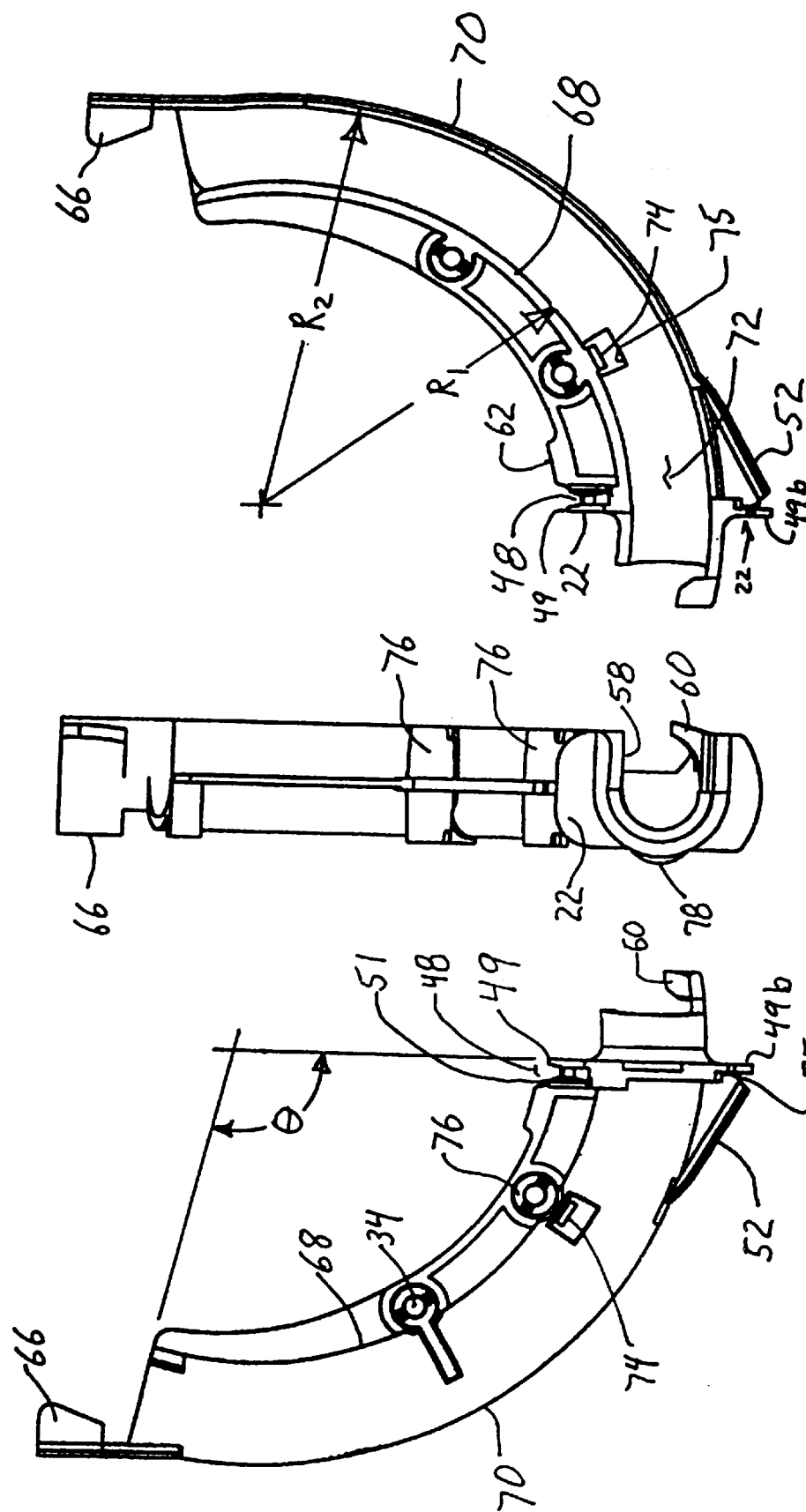

BRACKET FOR SECURING PIPES

This application claims the benefit under 35 U.S.C. §119(e) of provisional application Ser. No. 60/131,007, filed Apr. 23, 1999.

BACKGROUND OF THE INVENTION

Conventional plumbing and piping systems generally include one or more pipes which distribute fluids such as water, to desired locations. These conventional piping systems are often constructed from metal or polyvinylchloride (PVC) pipes and these pipes are typically connected by various types of known fittings. Because metal and PVC pipes are generally inflexible, when it is necessary for the pipe to turn at an angle, such as 90°, the pipes are cut to the desired length and an angled section, such as an elbow or a 90° connector, is used to join the pipes. This method requires that the pipes be cut at the correct length and then fastened to the angled section in a manner that does not allow the fluid contained within the piping system to leak. The time required for installing the system is increased because the pipes must be cut and fastened to other angled sections, and the added connections increase the possibility that the piping system will leak.

To overcome the difficulty and delay in forming a pipe that bends at angles or bends around corners, flexible tubing can be used, such as cross-linked polyethylene (PEX) tubing. In addition to being able to bend around corners, PEX tubing is advantageous because if water freezes within the tubing, it is flexible enough to expand and prevent rupture. Unfortunately, the flexible PEX tubing deforms locally if it is bent at too tight of a radius, and this deformation blocks or unacceptably restricts the flow of fluid within the tubing. Some curved braces have been provided to help avoid this kinking, but those braces can be difficult to install and use, and costly to manufacture, and are generally lacking in versatility of application.

There is thus a need for an improved method and apparatus to allow the use of flexible pipe around corners that does not unacceptably restrict the flow of water through the pipe.

BRIEF SUMMARY OF THE INVENTION

A bracket is provided to hold a flexible tube in a bent configuration. The bracket has a curved shape with a collar or flange at one end to hold a tube in a first direction. The first end also incorporates a flexible lever which serves as a locking device in one mode of use, as described later. The bracket has an opposing end that holds the tube in a second direction, with the tube being bent in between the two ends of the bracket along a defined bending profile. The bracket advantageously encloses part of the tube to support the tube as it bends and to limit the radius at which the tube bends. The bracket preferably has two spaced-apart holes through which fasteners can be inserted to fasten the middle support to a stud, joist, or other structural member as desired in one mode of use. Preferably, the bracket also has spacers with ends configured to abut the ends of adjacent spacers on adjacent brackets so the brackets can be stacked side-by-side so two nails can fasten several brackets to a stud.

In a second mode of use, the smaller, second end of the curved bracket is inserted through a hole in a strap that is fastened to one or more studs or framing members of a building. The collar at the first end has a grooved portion to restrain movement of the bracket within the hole. The lever flexes out of the way to allow the bracket to be inserted through the hole and the groove to be seated, but springs back to rigidly engage one side of the strap, and thus provide a solid resistance to removal of the bracket once installed. Advantageously, depending on the shape and dimensions of the hole in the strap, the bracket may also be rotated into any desired orientation after installation.

In more detail, there is provided a bracket for forming and holding flexible tubing in a bent configuration. The bracket has an inner wall defining a first radius of curvature along an axis of predetermined length and having opposing first and second ends. The bracket has an outer wall defining a second radius of curvature that is greater than the inner radius of curvature by at least the outer diameter of the tubing to be located in the bracket during use of the bracket, with the outer wall being located adjacent at least the first and second ends to engage sides of the tubing and limit the angle at which the tubing enters and leaves the bracket. The inner and outer walls are connected but provide a slot along at least a substantial length of the inner wall. The slot is sufficiently large to allow the tubing to be inserted through the slot during use of the bracket. At least one lateral restraint is connected to the bracket and extends at least partially across the slot to maintain the tubing in the bracket during use of the bracket. Preferably, the slot extends the entire length of the bracket and a middle wall connects the inner and outer walls to form a channel having a generally C-shaped cross-section.

Advantageously, the bracket has at least one and preferably two spacers extending along axes that are orthogonal to the first radius of curvature. The spacers are of predetermined length and have ends configured to abut similarly shaped ends, so that, with the cooperation of other features and projections of the bracket, multiple brackets may be stacked with the spacers abutting, with the length of the spacers being selected to maintain the center lines of tubing held by adjacent brackets to be at a predetermined distance. The spacer ends and other features and projections of the bracket are also configured to provide a stable mounting plane against a flat adjacent surface. Moreover, the spacers preferably have a hole through each of them with the holes being sized to allow passage of a fastener to fasten the bracket to a structural support. A second bracket, or any multiple of brackets, of any of the configurations defined herein can be placed adjacent another bracket in a side-by-side manner, with the spacers abutting each other and with the holes aligned so that a fastener extends through the aligned holes to fasten the brackets to a structural support.

In a further embodiment, a flange is adjacent the first end of the inner wall and connected to the inner and outer walls. The flange preferably has at least one peripheral portion configured to engage the edges of a opening in a plumbing strap to resist linear movement of the flange and bracket in the plane of the strap at the location of the opening into which the flange is inserted during use of the bracket.

Moreover, a resilient latch can be connected to the bracket adjacent the flange. The latch can bend to allow resilient passage through the opening in the strap during use of the bracket and then expands into a position to engage the strap and prevent passage back through the opening.

Additionally, the bracket can have a tab extending outward from one of the walls a distance greater than the flange. The tab is offset from the flange a distance sufficient to allow the plumbing strap to be inserted between the flange and the tab during use of the bracket.

The above features can be used in differing combinations with some features being omitted from the combinations.

The invention also contemplates the use of the above apparatus in various methods for supporting and holding tubing. These methods include a method for supporting flexible tubing in a curved orientation using a bracket having an inner wall defining a radius of curvature suitable for the tubing and having a flange on a first end of the inner wall and extending outward. The method includes the steps of inserting the flange into an opening in a plumbing strap to engage a periphery of the flange with an inner edge of the strap defining the opening into which the flange is inserted in order to restrain movement of the flange in the plane of the strap. The flange has a portion of its periphery with a groove sized to receive the strap and the strap is placed into the groove to restrain movement of the flange perpendicular to the strap. The bracket has a resilient latch with a distal end extending outward of the flange so the latch resiliently moves to pass through the opening in the strap and be placed adjacent an opposing side of the strap to further restrain movement of the bracket perpendicular to the strap. The bracket also preferably has an elongated slot extending at least from the flange to a second end of the bracket. A distal end of the tubing is inserted through an opening in the flange and the tubing is guided into the slot with the inner and outer walls causing the tubing to follow to the shape of the inner wall without kinking. The tubing can be inserted before or after the bracket is inserted into the plumbing strap.

BRIEF DESCRIPTION OF THE SEVERAL VIEWS OF THE DRAWINGS

Further features and advantages of the invention will be better understood by reference to the following detailed description and drawings in which like numbers refer to like parts throughout, and in which:

FIG. 5 is a cross-sectional view taken along section 5—5 of FIG. 8;

FIG. 6 is a cross-sectional view taken along section 6—6 of FIG. 8;

FIG. 7 is a cross-sectional view taken along section 7—7 of FIG. 8;

FIG. 8 is a hidden-line left side view of the bracket of FIG. 12;

FIG. 9 is a left side view of the bracket of FIG. 10;

FIG. 10 is a front view of the bracket of FIG. 1;

FIG. 11 is a right side view of the bracket of FIG. 10; and

DETAILED DESCRIPTION

Figure 1:
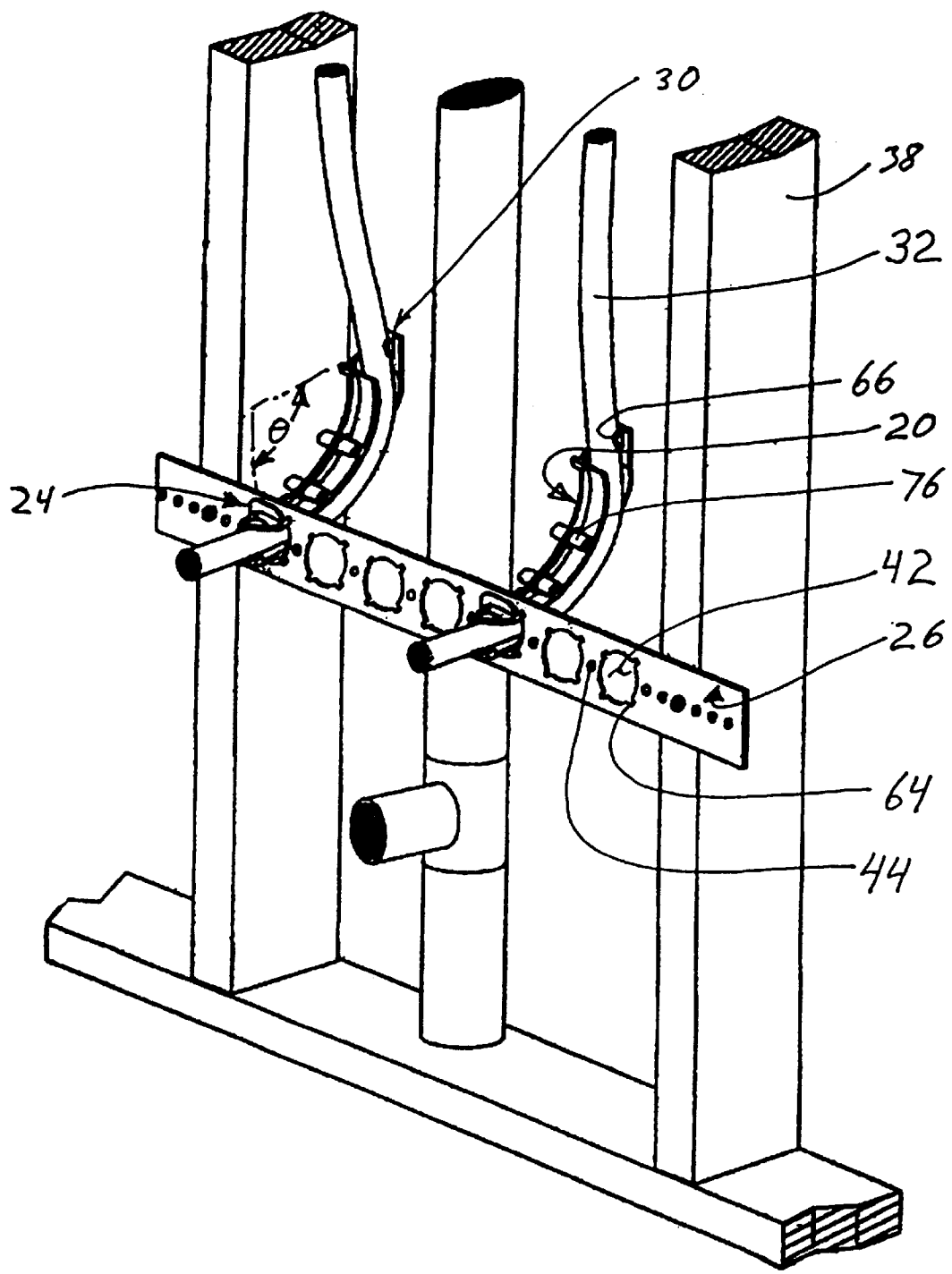
FIG. 1 shows a perspective view of the bracket of this invention fastened to a plumbing strap.
Figure 2:
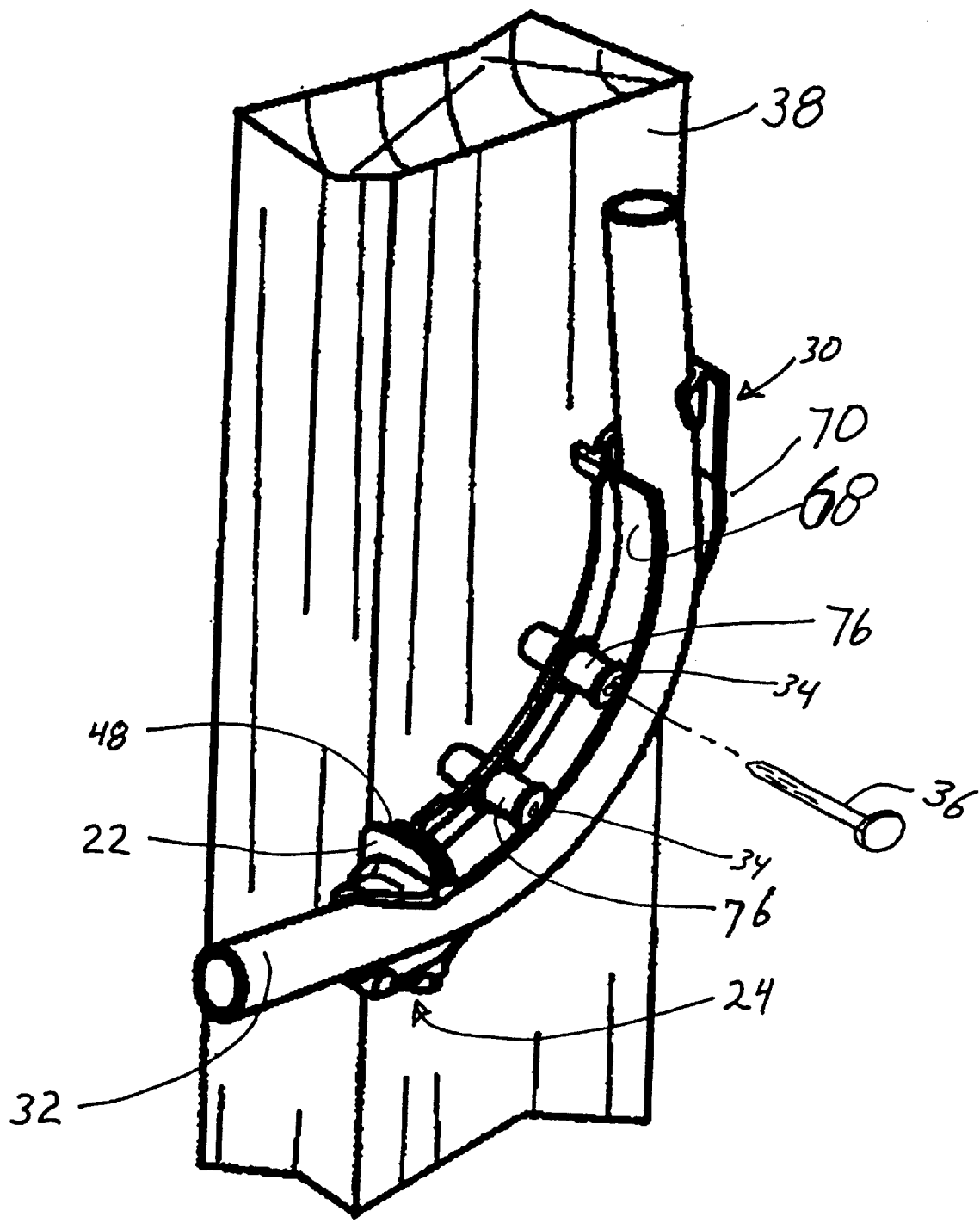
FIG. 2 shows the bracket of FIG. 1 mounted to a stud.

The following description will be given with the tubing comprising plumbing pipes, such as hot and cold water pipes, although the invention is not so limited and can be usable with gas lines, cables, electrical conduit and other flexible lines. Referring to FIGS. 1–3 and 8, a bracket 20 has a mounting collar that advantageously takes the form of a flange 22 located at a first end 24 of the bracket 20 with the flange being adapted to fasten to a support such as a plumbing strap 26 (FIG. 1) as described in greater detail at a later point. An opposing, second end 30 of the bracket 20 is orientated at an angle θ relative to the first end 24 so that a tubing 32 held by the bracket 20 is held in a bent orientation as reflected by the change in orientation of the centerline 33. Intermediate the first and second ends 24, 30 the bracket 20 has two holes 34 through which a fastener 36 can be extended to fasten the bracket to a building support 38, such as a wall stud. The bracket 20 is configured to hold tubing 32 in a bent position.

Figure 3:
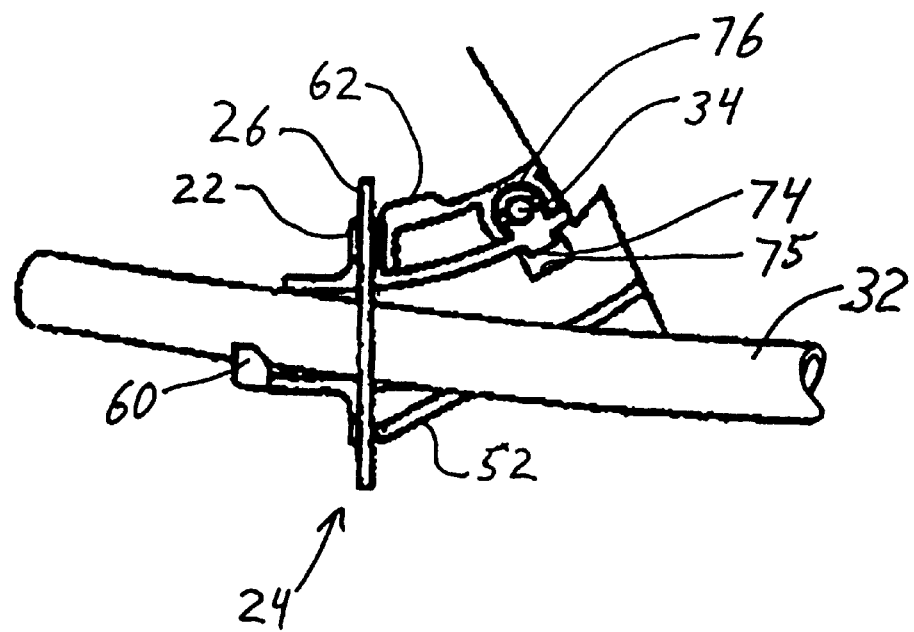
FIG. 3 shows a portion of the bracket of FIG. 1 with a tubing partially installed in the bracket.

Referring to FIGS. 1, 3 and 8, the plumbing strap 26 preferably comprises a flat strip of material, preferably metal, having at least one hole or opening 42 (FIG. 1) through which the first end 24 extends after installation. Preferably there are a plurality of spaced holes or openings 42 to accommodate various spacings between tubing 32. Fastening holes 44 are at distal ends of the strap and preferably intermediate the holes 44. The fastening holes 44 allow fasteners, such as nails or screws etc. to be inserted to fasten the plumbing strap 26 to a structural support. A flat metal strap about 2 inches wide and 20 inches long is suitable to extend between the studs using the most common stud spacings currently in use. The strap 26 could take other forms, such as a T form with the cross-bar of the T fastened to a stud and the leg of the T extending vertically or horizontally. Other configurations of plumbing straps 26 are known and are suitable for use with this invention.

The flange 22 cooperates with the edges of the hole 42 in the strap 26 to hold the bracket 20. The outer or distal portion of flange 22 has a recess 48 shaped like a notch or groove (FIGS. 5 & 8–9) along at least a portion of its periphery. The recess 48 is located between and advantageously formed by a first forward wall 49 (FIG. 9) located toward the interior of the room during use, and a rearward wall 51 (FIG. 9) located further away from the interior of the room during use. The rearward wall 51 and hole 42 have a cooperative size and shape so that the rear wall of the outer portion of the flange 22 can fit through the hole or opening 42 in the strap. Preferably, the forward wall 49 of the recess 48 is sized larger than the rear wall 51 and sized and shaped relative to the opening 42 so that the forward wall 49 will not pass through the hole 42. Further, the forward wall 49 of the outer portion of flange 22 is in the same plane as the lower portion 49b (FIG. 9) of the flange 22, and the two portions (49, 49b) together define a surface which is sufficiently large that it will not pass through hole 42, and thereby restrains movement of the flange in one direction relative to the strap 26 along the centerline 33 of the tubing 32. Preferably then, the two walls 49, 51 of the recess 48 are placed on opposing sides of the strap 26 to abut the strap and limit motion of the bracket relative to the strap along the longitudinal axis of the tubing 32.

Preferably the flange 22 has a non-circular shape. A generally rectangular shape as shown in FIG. 5 is suitable although other combinations of shapes between the hole 42 and flange 22 can be used. Tilting the flange 22 allows the second end 30 of the bracket to be inserted from the exterior side of the strap 26. The interior side is the side located toward the wall of the building, with the opposing side of the strap being the exterior side, the side facing toward the inside of the room.

Preferably the recess 48 forms a U-shaped channel or notch that extends along the periphery and has a curvature configured to match that of the mating edge of the hole 42. As the bracket 20 is inserted through the hole 42, the recess 48 can be placed on the edge of the hole so part of the flange 22 is on each side of the strap 26, as shown in FIG. 3. This same result can be achieved by placing a second flange spaced apart from the first flange, so the flanges cooperate to trap the edge of the strap 26 between them and restrain movement of the flange and bracket relative to the strap 26—along the centerline 33. As shown in FIG. 5, the recess or notch 48 need not extend entirely around the periphery, and in the depicted embodiment the recess 48 is located only on one edge of the flange 22.

Of course to restrain relative motion the notch 48 in the flange 22 must remain engaged with the edge of the strap 26. If the bracket 20 is rotated so that the notch 48 is on the bottom of the bracket, then gravity helps maintain the engagement. But if the notch 48 is rotated so it is at the top, then it is helpful to add a ledge at the bottom that engages the edge of the hole 42 to prevent the bracket 20 from falling downward with gravity, and disengaging the notch 48 from the edge of the strap. There is thus a ledge 50 (FIGS. 5, 8) opposite the notch 48, on the flange 22. The ledge extends from the interior side of the flange 22, along the central axis 33, a distance sufficient to engage the edge of the hole 42 and prevent the notch 48 from disengaging from the strap.

To provide a positive, latching engagement of the bracket 20 with the strap 26, a latch 52 is preferably used. Referring to FIGS. 1, 3 and 8, the latch 52 can take various forms to provide a lock. Preferably, the latch 52 comprises an elongated member that has one end fastened to the bracket 20 and a free, distal end located adjacent the back or interior side of the flange 22 adjacent the ledge 50. The distal end of the latch 52 is spaced a sufficient distance from the back side of the flange 22, the side facing the interior of the flange, to permit the thickness of the strap 26 to pass intermediate the two, with a slight interference. The latch is sufficiently resilient that it can move radially toward and away from the centerline 33, and the latch angles from the bracket 20 radially outward toward the edge of the flange 22. The distal edge of the latch is outward of the ledge 50. Thus, the bracket 20 can be inserted into the hole 42 from the exterior side of the strap 26 or the wall, with the latch resiliently bending toward the bracket to allow insertion through the hole 42 until progress is stopped by the flange 22, and after insertion the latch resiliently moves outward away from the bracket so that the distal end of the latch 52 will not fit back through the hole 42.

The distal end of the latch 52 thus prevents movement of the bracket 20 back through the hole 42 along centerline 33 (orthogonal to the plane containing the hole 42). The ledge 50 and recess 48 engage the edges of the hole 42 to restrain movement in the plane of the hole. The recess 48 on the periphery of the flange 22 engages opposing sides of the strap 26 and in cooperation with the latch 52 to restrains rotation of the bracket except for rotation in the plane containing the hole 42. Alternatively phrased, the walls 49, 51 on the distal edge of the flange 22 engage opposing sides of the opening 42 in the strap 26. The recess 48, flange 22 and latch 52 also cooperate with the edges of the hole 42 in the strap 26 to restrain translation of the bracket relative to the strap in all three translational axes. There is thus advantageously provided a resilient snap-lock to releasably fasten the bracket 20 to the strap 26. Other resiliently deformable locking devices can be used, and will be known to one skilled in the art given the present disclosure.

Referring to FIGS. 8–9 and 11, the distal end of the latch 52 is adjacent the ledge 50. The distal end of the latch 52 is preferably not square cut relative to an axis orthogonal to the longitudinal axis of the latch 52. Rather, the distal end of the latch 52 is preferably angled and the ledge 50 is preferably undercut so that as the latch 52 bends radially toward the centerline 33, the angled distal end just misses the ledge 50 and the undercut of the edge. Advantageously, when the strap 26 is in a vertical orientation parallel to the walls of a building, the angle between the plane of the strap and the latch member 52 is about 119° (FIG. 8). If desired, while the ledge 50 is preferably undercut, a stop ledge 54 (FIG. 5) can be provided to engage the distal end of the latch member 52 and stop its movement toward centerline 33. The stop could be used to ensure the latch 52 is not bent against the bracket 20 so as to break the latch.

Referring to FIGS. 3, 5 and 8, the distal end of the bracket 20 extends beyond the flange 22 at the first end 24. The distal portion of the first end 24 surrounds portions of three sides of the tube 32 with one side open to allow insertion of the tube into the bracket 20. Preferably the first end 24 has a flat bottom 56 and an opposing flat top 58, as best seen in FIG. 5. A lip 60 is provided to restrain movement of an inserted tube 32 out of the bracket 20. Advantages of this construction will be explained later.

Referring to FIGS. 1, 3 and 8, located behind the flange 22 and the recess 48 is an outwardly projecting tab 62. Tab 62 is radially further from the centerline 33 than the diameter of the hole 42 in the strap 26. But the holes 42 preferably have one or more radially extending recesses 64 preferably shaped like slots, sized and located to allow passage of the tab 62. Thus, the tab 62 can be inserted through the hole 42 and recesses 64, but if rotated in the plane of the hole 42, cannot pass back through the hole. As shown best in FIG. 1, there are preferably four recesses 64, comprising radially extending, rectangularly shaped slots extending from the hole 42. Advantageously the recesses are located other than at the vertical edges of the hole 42, and are preferably located at angles of 45°, 135°, 225°, and 315° from the vertical axis, around the periphery of the hole 42.

This construction allows the second end 30 of the bracket 20 to be inserted from the outside of the strap 26, with the tab 62 passing through recess 64, and the recess 48 engaging the edge of the hole 42 and the latch 52 bending to allow the ledge 50 to engage the edge of the hole 42. Once inserted, the bracket 20 can be rotated 45°. In this orientation the tab 62 which is opposite the latch 52 can provide an additional barrier to removing the bracket 20 back through the opening 42 as it is outward of the distal portion of the wall 51 (FIG. 9). The tab 62 also keys the bracket 20 to a strap 26 configured to have the correct dimensions for use with the bracket and its flange 22.

Referring to FIGS. 1 and 8, the bracket 20 has its opposing ends 24, 30 at different orientations to hold the tubing 32 in a bent configuration. The ends 24, 30 can be connected by straight or curved supports, but preferably are connected by a curved support 68 having a constant curvature. The amount of the curvature will depend on the angle at which the tubing 32 is to be bent and held by the bracket 20. The illustrations show a bend of 90°, although greater or lesser bends can be used.

The curved wall 68 is referred to as the inner wall as it is radially inward of the radius of curvature 33 of the tubing 32. The wall 70 is referred to as the outer wall because it is radially outward of the radius of curvature 33 of the tubing 32. The directions inner and outer will refer to the direction relative to the centerline 33 of the tubing 32.

The bracket 20 thus preferably forms a curved tube having an elongated slot along one side of the tube to provide an opening large enough to allow the tubing 32 to be inserted into the bracket. The bracket 20 has an approximately C-shaped cross section for most of its length, with the two opposing legs of the C formed by walls 68, 70, with wall 70 having a larger radius of curvature than wall 68 (R2 greater than R1 as shown in FIG. 8). The middle portion of the C is formed by middle wall 72 that extends in the plane of the radius of curvature. The inner diameter of the C-shaped cross-section is preferably slightly larger than the outer diameter of the tubing 32 to be held by the bracket. If the inner diameter of the bracket 20 is too much larger than the outer diameter of the tubing 32, the tubing can assume undesired orientations and kink, reducing flow through the tubing, or it may not be properly retained in the bracket 20.

The body of the bracket 20 advantageously comprises an inner wall 68 having an inner radius of curvature and an opposing outer wall 70 having an outer radius of curvature with the inner and outer walls being joined by a middle wall 72. Advantageously, the walls 68, 70, 72 surround three sides of the tube 32, but form a slot or open side on the fourth side to allow insertion and removal of the tube from the bracket. The bracket 20 thus has an opening that preferably extends along at least a substantial portion of the bracket 20, and preferably extends along the length of the bracket through which the tubing 32 is inserted, with the bracket 20 surrounding a sufficient portion of the inserted tubing to make it conform to the curvature of the bracket and that can be less than the three sides shown. It is possible to have the flange 22 completely encircle the tubing 32 and the tubing inserted through the opening in the flange, thus the slot need not extend for the entire length of the bracket. The body of the bracket between the ends 24, 30 can be solid or have openings, as long as it provides sufficient support to maintain the curvature of the tubing while reducing kinking and unacceptable restriction of the tubing.

Specifically, as the tubing 32 bends in a curve, it desirably has an interior shape that is substantially constant along the length of the curved portion. For circular tubing that is bent, the interior shape is typically slightly elliptical with the minor axis of the ellipse passing through the radius of curvature. When localized bending or kinking occurs, the interior shape of the tubing changes and distorts from a constant shape to assume a different, localized shape where the localized bending occurs. One sidewall of the tubing wall will often collapse and form a much straighter line, causing opposing walls to approach each other and reducing the cross-sectional area of the tubing. If the tubing is hollow, it reduces the flow through the restricted area and increases the pressure. If the tubing is filled with materials such as wires, it transfers substantial forces to the material inside the tubing and can damage that material, such as the wires.

Using a series of adjacent posts to define the curve and form the inner and outer walls 68, 70 is possible, but each post presents a potential site for localized bending. Similarly, a series of small flat plates could be used to define the curve forming the inner and outer walls 68, 70, but the edges of the flat plates present potential sites for localized bending. For some tubing, the posts or flat plates may be suitable, but it is preferred that a continuous curved support contact the tubing 32 along sufficient portions of the tubing to prevent a localized bending and restriction in the tubing internal diameter along the curved segment.

Referring to FIGS. 1 and 8, the second end 30 of the bracket 20 preferably has a flat top and bottom similar to that of the first end 24. A lip 66 is also preferred to help keep the tubing 32 from sliding out of the bracket 20 through the open side. Both the lips 60 and 66 extend into the open side of the bracket 20. Both lips 60 and 66 are preferably located on the side of the bracket 20 that has the greatest radius of curvature, side 70, because the bent tubing 32 wants to straighten out and will be urged against that side of the bracket, at least adjacent the ends 24, 30 of the bracket where the lips are preferably placed. The lips 60, 66 provide a lateral restraint to help keep the tubing in the bracket 20. The side of the bracket 20 that has the smaller radius of curvature, side 68, is shorted and does not extend over the lips 60, 66. That provides an opening above the lips 60, 66 so that a user can move the tubing 32 over the lips in order to place the tubing into the bracket.

To install the tubing in the bracket 20, the bracket is first connected to the strap 26 by inserting the second end 30 through opening 42 and engaging the flange 22 with the edge of the opening 42 in the strap, as described above. Then, referring to FIG. 3, the tubing is inserted through the first end 24 of the bracket 20 from either side of the strap 26. The tubing 32 is normally inserted from the interior, wall side of the strap 26. The flat bottom 56 (FIG. 5) and open side allow the tubing 32 to pass through the strap 26 at an angle to the strap and at an angle to the centerline 33 of the bracket. Once the tubing 32 is inserted through the first end 24, the tubing is bent to conform to the curvature of the bracket 20 and placed through the open side of the bracket into the bracket. The tubing is lifted over the lip 66 at the second end 30, with the tubing resisting being so bent and resiliently urging the tubing against the side wall 68 of the bracket 20 having the greatest curvature—at least at the ends 24, 30 of the bracket. Preferably, the lips 60, 66 are curved to have about the curvature as the outer diameter of the tubing 32, and are located so that the lips are on a common diameter as the middle portion of the sidewall, as best seen in FIG. 5. The curved wall 68 having the smaller radius of curvature guides the tubing 32 during bending and prevents it from localized bending or kinking that would restrict flow through the tubing. Once the tubing 32 is inserted in the bracket 20, the tubing will orientate the bracket by twisting the bracket in the rotational plane of the strap. It is possible to glue, screw or otherwise fasten the bracket 20 to the plumbing strap in order to maintain a desired orientation of the bracket 20 and tubing 32 relative to the plumbing strap.

The lips 60, 66 are preferably located on flat plates that extend tangentially from the side 70 of the bracket 20 that has the largest radius of curvature. Advantageously, the inner and outer walls 68, 70 are flat for the length of the bracket 20. Referring to FIGS. 5 and 7, there is preferably a further lateral restraint, third lip 74, intermediate the first and second ends 24, 30 and intermediate the lips 60, 66. The third lip 74 helps stop the middle of the tubing 32 from sliding out of the opening through which the tubing is inserted into the bracket. The location of the third lip 74 will vary, and it may be omitted altogether. But for a 90° bracket 20, the lip 74 is preferably located at about 26° from the first end 24. The lip 74 is preferably angled on the side that abuts the tube 32 when inserted into the bracket 20, so the lip does not abrade or damage the tubing. The lip 74 is also preferably located so it maintains the tubing 32 against the middle wall 72 of the bracket 20.

The bracket 20 is preferably molded from plastic, such as 30% glass filled nylon 6/6. In order to mold the third stop 74, an opening 75 is preferably formed in the middle side wall to allow a plug to form the stop in the curved surface during molding.

Referring to FIGS. 2–5, the bracket 20 preferably has two holes 34 through which fasteners 36 can be inserted to fasten the bracket 20 to a structural support, such as studs 38 commonly found in houses and buildings. The fasteners can include nails, screws, bolts or other fasteners suitable to the purpose. While a single hole 34 could be used, there are preferably two or more holes 34. Two holes allow two fasteners 36 which will prevent the bracket 20 from rotating in the plane containing the centerline 33, and thereby avoiding kinking the tubing 32 outside the bracket 20. If a single fastener 36 is used, the bracket 20 can rotate about the fastener. Two or more fasteners 36 keep the bracket from rotating about the fasteners.

In the first embodiment of FIG. 1, the strap 26 prevents that rotation. In the illustrated embodiment of FIG. 2, the holes are molded into the bracket on the side 68 having the smallest radius of curvature. The holes could be molded or formed elsewhere, including the other side 70 having the greatest radius of curvature, or simply formed in wall 72. The holes are sized relative to the fasteners 36 so there is not a lot of play or motion between the holes and the fastener so that the bracket cannot move much once the fasteners 36 are inserted into the holes.

Figure 4:
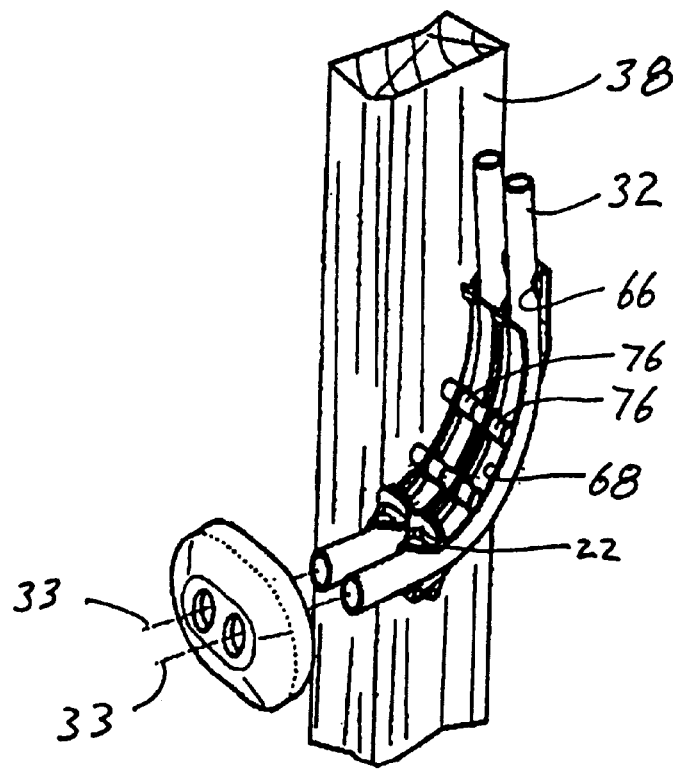
FIG. 4 shows two brackets of the type shown in FIG. 1 fastened to a stud.
Figure 12:
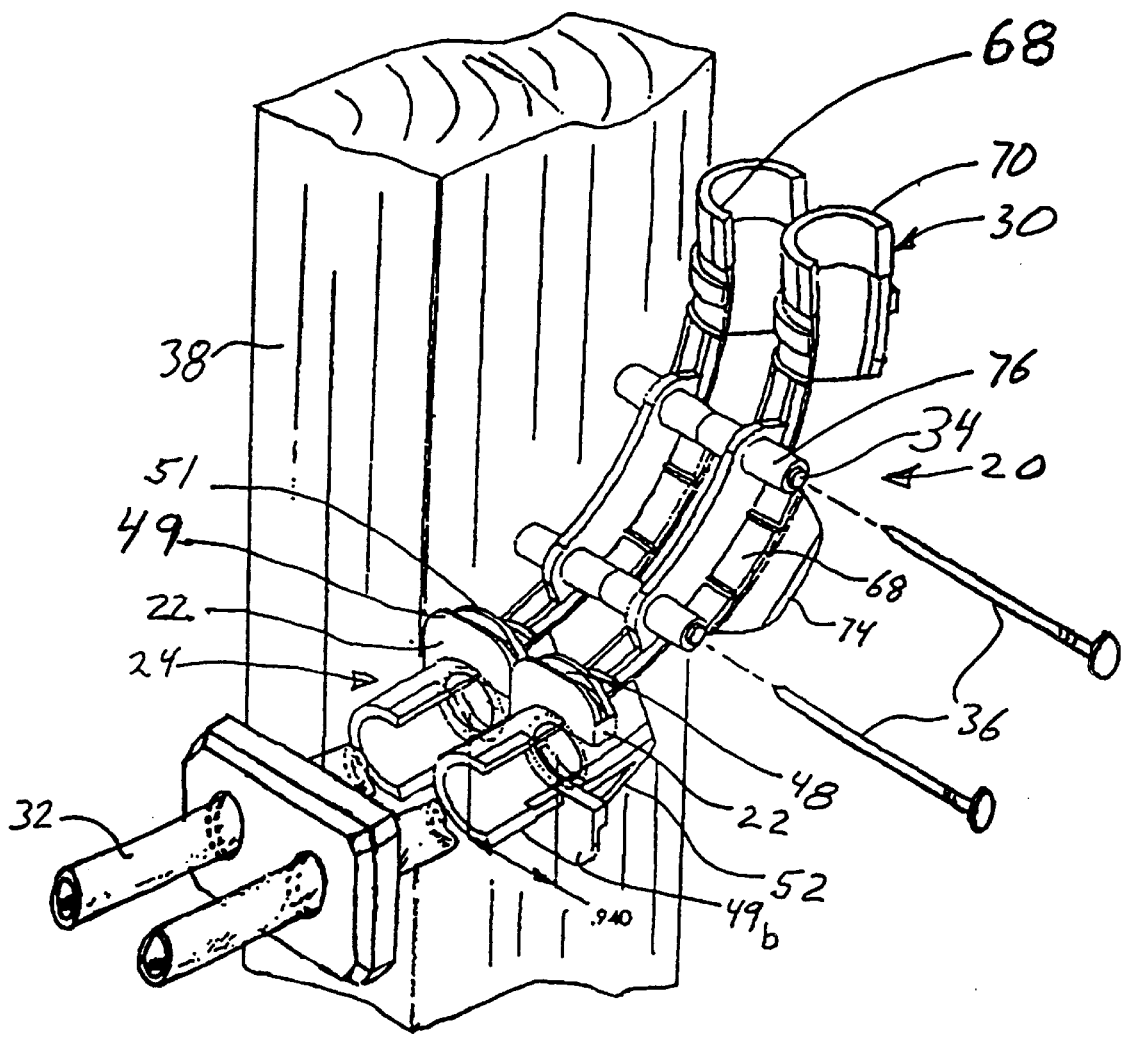
FIG. 12 is a exploded perspective view of two brackets fastened to a support.

Referring to FIGS. 2, 4 and 9–12, the holes 34 preferably extend through a portion of the bracket 20 that has a predefined width so that two or more brackets 20 can be stacked adjacent each other and fastened to a support by the same fasteners 36 as shown in FIG. 4. The spacing is selected so that the center lines 33 of the tubing 32 are at standard distances to accommodate existing fixtures for paired plumbing lines, such as hot and cold water lines in homes and buildings.

To better achieve this alignment, the holes 34 are preferably molded through spacers 76. The spacers 76 are shown as cylindrical bosses through which the holes 34 are molded. The spacers extend along axes orthogonal to the plane containing the radius of curvature of tubing 32. The length of the spacers is preferably about one inch to allow for proper spacing of paired, ⅜ inch industry nominal polyethylene tubes. The ends of the spacers 76 are preferably flat, and located to align and abut the spacers 76 on an adjacent bracket 20 so the brackets can be stacked side-by-side and maintain a stable alignment.

To further help stacking, while increasing the protection given to the tubing 32, the inner wall 68 having the lesser radius of curvature can be extended to end in the same lateral plane as the spacers 76. Thus, adjacent walls 68 abut and spacers 76 abut, in the same planes. This construction results in the wall 68 being wider than the wall 70. By abutting, and aligning the adjacent spacers 76 and walls 68, the brackets 20 can be stacked and fastened to a stud by common fasteners, as shown in FIG. 4. For a more stable stackable structure, it is also desirable to have the flanges 22 and the distal ends of the flat bottom 56 and flat top 58 extend the same lateral distance as the spacers 76.

To help maintain alignment of stacked brackets 20, a protruding spacer, such as circular tab 78 is located over the middle wall 72 and extends from the flange 22 and away from the from the wall 68. When two brackets 20 are stacked, the spacer 76 extends into the space over the lip 60 at the first end 24 of the bracket to help guard against removal of the tubing 32 and to provide some alignment of the first ends 24 of adjacent brackets 20 during stacking. Spacer 76 also serves as an alignment device for setting the depth of the bracket 20 when attached to a framing member, such as a stud 38. The end of the spacer is shaped to cooperate with abutting ends of spacers to ensure stable stacking.

There is thus advantageously provided a bracket 20 that allows flexible tubing 32 to be bent and maintained at a predetermined angle while avoiding kinking of the tubing that restricts fluid flow or damages what is inside the tubing. The brackets can be removably fastened to plumbing straps 26 of various types. The brackets can be fastened to studs or other supports by commonly available-fasteners. Both the strap and using fasteners allow a bracket support that does not rotate in the plane containing the centerline of the tubing 32. The brackets can be stacked to allow adjacent positioning of tubing 32 while protecting the tubing from damage and while maintaining the tubing at predetermined spacings that advantageously conform to industry standard spacings. The bracket can be integrally molded in a single molding process to provide a cost effective support for the tubing.

The above description is given by way of example, and not limitation. Given the above disclosure, one skilled in the art could devise variations that are within the scope and spirit of the invention. Variations include various ways of configuring the bracket while still providing the mounting flange 22, lips 60, 66 and 74, and supporting the tubing 32 sufficiently to prevent unintended localized bending of the tubing. An additional variation is to use one hole 34 through the bracket 20 to hold the bracket from rotation, as for example by placing a cooperatively shaped head to engage a cooperatively shaped abutment on the bracket, or to connect the fastener 36 to the structural support with sufficient strength that the frictional connection between the bracket and the fastener prevents rotation of the bracket. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A bracket for holding flexible tubing in a bent configuration, the tubing having an outer diameter, comprising:

an inner wall defining a first radius of curvature along an axis of predetermined length and having a first end and an opposing second end;

an outer wall defining a second radius of curvature in the same plane as the first radius of curvature that is greater than the first radius of curvature by at least the outer diameter of the tubing to be located in the bracket during use of the bracket, at least a portion of the outer wall being located adjacent to at least the first end and the second end of the inner wall to engage sides of the tubing during use of the bracket and to cause the tubing to bend at an angle defined by one of the first and second radii during use of the bracket, the inner wall and the outer wall being connected but providing a slot along at least a substantial length of the inner wall, the slot being sufficiently large to allow the tubing to be inserted through the slot during use of the bracket, the angle of the subtended arc between the first and second ends along the second radius of curvature being different than the angle of the subtended arc between the first and second ends along the first radius of curvature;

a lateral restraint connected to the bracket and extending at least partially across the slot to maintain the tubing in the bracket during use of the bracket.

2. The bracket of claim 1, wherein at least one spacer extends along an axis that is orthogonal to the first radius of curvature, the spacer being of predetermined length and having ends configured to abut similarly shaped ends to allow adjacent brackets to be stacked with the spacer, the length of the spacer being selected to maintain the center lines of tubing held by the adjacent brackets to be at a predetermined distance.

3. The bracket of claim 2, wherein the at least one spacer has a hole there through along the length of the spacer, the hole being sized to allow passage of a fastener to fasten the bracket to a structural support, the hole is sized relative to the fastener to substantially restrict rotation in the plane when the fastener fastens the bracket to the support.

4. The bracket of claim 3, further comprising a second bracket as defined in claim 3, the first bracket and the second bracket side-by-side with the at least one spacer and aligning holes of the first bracket and the second bracket, and a fastener extending through two of the holes when in alignment.

5. The bracket of claim 2, further comprising a flange adjacent the first end of the inner wall and connected to the inner wall and the outer wall, the flange configured to engage edges of an opening in a plumbing strap during use of the bracket to resist translation of the flange and the bracket in a plane of the strap at the opening into which the flange is inserted during use of the bracket.

6. The bracket of claim 5, further comprising a resilient latch connected to the bracket adjacent the flange that bends to allow resilient passage through the opening in the strap during use of the bracket and then expands into a position to engage the strap and prevent passage back through the opening during use of the bracket.

7. The bracket of claim 5, wherein the slot extends the entire length of the bracket and wherein a middle wall connects the inner wall and the outer wall to form a channel having a generally C-shaped cross-section.

8. The bracket of claim 1, wherein the bracket has at least two holes there through along an axis orthogonal to the plane containing the first radius of curvature, the holes are each sized to allow passage of a fastener to fasten the bracket to a structural support, the holes are each sized relative to the fastener to substantially restrict rotation in the plane when the fastener fastens the bracket to the support.

9. The bracket of claim 1, further comprising a flange adjacent the first end of the inner wall and connected to the inner wall and the outer wall, the flange having at least one peripheral portion configured to engage edges of an opening in a plumbing strap during use of the bracket to resist movement of the flange and the bracket in a plane of the strap at the opening into which the flange is inserted during use of the bracket.

10. The bracket of claim 9, further comprising a resilient latch connected to the bracket adjacent the flange that bends to allow resilient passage through the opening in the strap during use of the bracket and then expands into a position to engage the strap during use of the bracket and prevent passage back through the opening.

11. The bracket of claim 9, wherein the plumbing strap has a plurality of openings at predetermined, equally spaced locations, the peripheral portions of the flange engaging the edges of the openings in the strap.

12. The bracket of claim 11, wherein each of the plurality of openings in the strap have at least one slot extending radially outward from centers of the openings, the slots sized to allow passage of the tab through the slot when the tab is aligned with the slot.

13. The bracket of claim 9, further comprising a tab extending outward from one of the inner and outer walls a distance greater than the flange, the tab being offset from the flange a distance sufficient to allow the plumbing strap to be inserted between the flange and the tab during use of the bracket.

14. The bracket of claim 1, wherein the slot extends the entire length of the bracket and wherein a middle wall connects the inner wall and the outer wall to form a channel having a generally C-shaped cross-section.

15. A method of restraining tubing using the bracket defined in claim 1, comprising the steps of inserting the tubing into the bracket through the slot and further including the non-sequential step of fastening the bracket to a support structure.

16. The method of claim 15, wherein the bracket further includes at least two holes each orthogonal to the radius of curvature of at least one wall, and wherein the fastening step comprises the further steps of placing a separate fastener through each of the holes and into a structural support to fasten the bracket to the support.

17. The method of claim 16, further comprising a second bracket as defined in claim 16, and wherein the fastening step comprises the further steps of fastening the bracket and the second bracket side-by-side with the holes in each of said brackets aligned and placing a fastener through an aligned hole of each bracket and into the support.

18. A bracket for supporting bent tubing, comprising:
an inner wall defining a first radius of curvature selected to avoid unacceptable kinking of the tubing when the tubing is placed in the bracket, the inner wall having a first end and an opposing second end;
an outer wall spaced apart from the inner wall with at least a portion of the adjacent the first end and the second end, the outer wall being spaced apart from the inner wall a distance sufficient to accommodate the tubing during use of the bracket, the inner wall and the outer wall being connected to maintain the walls in a predefined location relative to each other but forming an elongated slot extending at least a substantial length of the inner wall, the slot being wide enough to allow insertion of the tubing through the slot during use of the bracket; and
a flange connected to at least one of the inner wall and the outer wall and extending outward therefrom, the flange having a peripheral portion adapted to fit into and engage edges of an opening in a plumbing strap during use of the strap to restrain movement of the flange in a plane that contains the opening in the plumbing strap during use of the bracket.

19. The bracket of claim 18, wherein the peripheral portion has a groove sized and configured to receive an edge of the opening in the plumbing strap during use of the strap so that a portion of the flange is placed on opposing sides of the strap during use of the strap.

20. The bracket of claim 19, further comprising a locking device that resiliently compresses to pass through the opening in the strap in a first orientation and is placed adjacent the strap in a second orientation to prevent passage of the locking device back through the strap.

21. The bracket of claim 20, further comprising at least two, spaced apart openings in the bracket each of which is sized to allow insertion of a fastener orthogonal to the first radius of curvature to fasten the bracket to a structural support during use of the bracket.

22. The bracket of claim 19, further comprising a resilient lever extending from one of the walls toward the flange so that a distal end of the lever is placed adjacent to but outward of the peripheral portion of the flange that engages the edge of the opening in the strap during use of the strap, the lever deforming to allow passage through the opening in the strap and expanding after passage through the opening.

23. The bracket of claim 22, wherein the peripheral portion of the flange adjacent the distal end of the lever is undercut to allow the distal end of the lever to resiliently bend inward of the peripheral portion of the flange during insertion of the lever through the opening during use of the bracket.

24. The bracket of claim 22, further comprising at least two spacers extending orthogonal to the first radius of curvature and each having an end configured to abut an end of an adjacent spacer on an adjacent bracket when brackets are stacked side-by-side.

25. The bracket of claim 18, further comprising at least two, spaced apart openings in the bracket, the openings each being sized to allow insertion of a fastener orthogonal to the first radius of curvature to fasten the bracket to a structural support during use of the bracket.

26. The bracket of claim 18, further comprising lateral restraints extending into the slot to inhibit removal of the tubing from the bracket during use of the bracket, one of the lateral restraints being located adjacent at least one of the first and second ends.

27. The bracket of claim 18, further comprising at least two spacers each extending orthogonal to the first radius of curvature and each having an configured to abut an end of a spacer on an adjacent bracket when brackets are stacked side-by-side.

28. A plumbing assembly, comprising the bracket of claim 18 in combination with a plumbing strap, the strap having an opening with edges, the edges cooperating with the flange to engage a peripheral portion of the flange.

29. The assembly of claim 28, wherein the opening has at least one slot extending outward therefrom a distance sufficient to accommodate passage of a tab located on the bracket, the tab extending outward a distance greater than the flange and spaced apart from the flange a distance sufficient to place the tab and a portion of the flange on opposing sides of the strap during use of the bracket.

30. An integrally molded bracket for supporting tubing to be bent into a curve at a radius of curvature, the tubing having a centerline, the bracket being configured to be fastened to one of an opening in a plumbing strap or to the structural support, the bracket comprising:

an inner wall and an outer wall each having different radii of curvature sufficient to allow insertion of the tubing between the walls and to maintain the desired curvature of the tubing during use of the strap, the outer wall having a radius of curvature that is larger than a radius of curvature of the inner wall, and with a middle wall joining the inner and outer walls, the inner and outer walls cooperating to form a slot therebetween and extending along at least a substantial portion of the bracket and sized to allow passage of the tubing through the slot;

a flange at a first end of the bracket, the flange being configured to fit through the opening in the plumbing strap and having a grooved portion opening away from the center line and configured to allow insertion into the grooved portion of an edge of the strap forming the opening during use of the strap;

at least one hole in the bracket orthogonal to at least one of the radius of curvatures and sized to allow passage of a fastener during use of the bracket to fasten the bracket to the structural support during use of the bracket.

31. The bracket of claim 30, further comprising at least two holes.

32. The bracket of claim 30, further comprising at least one spacer oriented orthogonal to the radius of curvature of one of the walls, the spacer having a predetermined length and an end configured to abut an end of an adjacent spacer on an adjacent bracket so the brackets can be stacked side-by-side in stable alignment with a spacing determined by said predetermined length.

33. The bracket of claim 32, wherein the at least one hole in the bracket is placed through the spacer.

34. A plumbing assembly, comprising the bracket of claim 30 combination with a plumbing strap, the strap having at least one opening sized to cooperatively engage the flange on the bracket.

35. A method for supporting flexible tubing in a curved orientation using a bracket having an inner wall defining a radius of curvature suitable for the tubing, the bracket having a flange on a first end of the inner wall and extending outward, comprising the steps of:

inserting the bracket into an opening in a plumbing strap to engage a periphery of the flange with an inner edge of the strap defining the opening into which the bracket is inserted in order to restrain movement of the flange in a plane of the strap at the opening, the flange having a portion of its periphery defining a groove sized to receive the strap with the inserting step placing the strap into the groove to restrain movement of the flange perpendicular to the strap, the bracket having a resilient latch with a distal end of the latch extending toward the flange so the latch resiliently moves to pass through the opening in the strap and be placed adjacent an opposing side of the strap to further restrain movement of the bracket perpendicular to the strap, the bracket having an elongated slot extending at least from the flange to a second end of the bracket; and inserting a distal end of the tubing through an opening in the flange and inserting the tubing into the slot with the inner and outer walls causing the tubing to follow to the shape of the inner wall without kinking, the tube being inserted before or after the bracket is inserted into the plumbing strap.

36. A bracket for holding flexible tubing in a bent configuration, the tubing having an outer diameter, comprising:

an inner wall defining a first radius of curvature along an axis of predetermined length and having a first end and an opposing second end;

an outer wall defining a second radius of curvature in the same plane as the first radius of curvature that is greater than the first radius of curvature by at least the outer diameter of the tubing to be located in the bracket during use of the bracket, at least a portion of the outer wall being located adjacent to at least the first end and the second end of the inner wall to engage sides of the tubing during use of the bracket and to cause the tubing to bend at an angle defined by one of the first and second radii during use of the bracket, the inner wall and the outer wall being connected but providing a slot along at least a substantial length of the inner wall, the slot being sufficiently large to allow the tubing to be inserted through the slot during use of the bracket;

a lateral restraint connected to the bracket and extending at least partially across the slot to maintain the tubing in the bracket during use of the bracket; and at least one spacer extending along an axis that is orthogonal to the first radius of curvature, the spacers being of predetermined length and having ends configured to abut similarly shaped ends to allow adjacent brackets to be stacked with the spacers of each abutting, the length of the spacers being selected to maintain the center lines of tubing held by the adjacent brackets to be at a predetermined distance.

37. The bracket of claim 30, wherein the at least one spacer has a hole there through along the length of the spacer, the hole being sized to allow passage of a fastener to fasten the bracket to a structural support, the hole is sized relative to the fastener to substantially restrict rotation in a plane when the fastener fastens the bracket to the support.

38. The bracket of claim 37, further comprising a second bracket as defined in claim 37, the bracket and the second bracket side-by-side with the spacers of each abutting each other and aligning holes of the first bracket and the second bracket, and a fastener extending through two of the holes when in alignment.

39. The bracket of claim 36, further comprising a flange adjacent the first end of the inner wall and connected to the inner wall and the outer wall, the flange configured to engage edges of a opening in a plumbing strap during use of the bracket to resist translation of the flange and the bracket in a plane of the strap at the opening into which the flange is inserted during use of the bracket.

40. The bracket of claim 39, further comprising a resilient latch connected to the bracket adjacent the flange that bends to allow resilient passage through the opening in the strap during use of the bracket and then expands into a position to engage the strap and prevent passage of the bracket back through the opening during use of the bracket.

41. The bracket of claim 39, wherein the slot extends the entire length of the bracket and wherein a middle wall connects the inner wall and the outer wall to form a channel having a generally C-shaped cross-section.

42. A bracket for holding flexible tubing in a bent configuration, the tubing having an outer diameter, comprising:
 an inner wall defining a first radius of curvature along an axis of predetermined length and having a first end and an opposing second end;
 an outer wall defining a second radius of curvature in the same plane as the first radius of curvature that is greater than the first radius of curvature by at least the outer diameter of the tubing to be located in the bracket during use of the bracket, at least a portion of the outer wall being located adjacent to at least the first end and the second end of the inner wall to engage sides of the tubing during use of the bracket and to cause the tubing to bend at an angle defined by one of the first and second radii during use of the bracket, the inner wall and the outer wall being connected but providing a slot along at least a substantial length of the inner wall, the slot being sufficiently large to allow the tubing to be inserted through the slot during use of the bracket;
 a lateral restraint connected to the bracket and extending at least partially across the slot to maintain the tubing in the bracket during use of the bracket; and
 wherein the bracket has at least two holes there through along an axis orthogonal to a plane containing the first radius of curvature, the holes are each sized to allow passage of a fastener to fasten the bracket to a structural support, the holes *are each sized relative to the fastener to substantially restrict rotation in the plane when the fastener fastens the bracket to the support.

43. A bracket for holding flexible tubing in a bent configuration, the tubing having an outer diameter, comprising:
 an inner wall defining a first radius of curvature along an axis of predetermined length and having a first end and an opposing second end;
 an outer wall defining a second radius of curvature in the same plane as the first radius of curvature that is greater than the first radius of curvature by at least the outer diameter of the tubing to be located in the bracket during use of the bracket, at least a portion of the outer wall being located adjacent to at least the first end and the second end of the inner wall to engage sides of the tubing during use of the bracket and to cause the tubing to bend at an angle defined by one of the first and second radii during use of the bracket, the inner wall and the outer wall being connected but providing a slot along at least a substantial length of the inner wall, the slot being sufficiently large to allow the tubing to be inserted through the slot during use of the bracket;
 a lateral restraint connected to the bracket and extending at least partially across the slot to maintain the tubing in the bracket during use of the bracket; and
 a flange adjacent the first end of the inner wall and connected to the inner wall and the outer wall, the flange having at least one peripheral portion configured to engage edges of a opening in a plumbing strap during use of the bracket to resist movement of the flange and the bracket in a plane of the strap at the opening into which the flange is inserted during use of the bracket.

44. The bracket of claim 43, further comprising a resilient latch connected to the bracket adjacent the flange that bends to allow resilient passage through the opening in the strap during use of the bracket and then expands into a position to engage the strap during use of the bracket and prevent passage of the bracket back through the opening.

45. The bracket of claim 43, further comprising a tab extending outward from one of the walls a distance greater than the flange, the tab being offset from the flange a distance sufficient to allow the plumbing strap to be inserted between the flange and the tab during use of the bracket.

46. The bracket of claim 43, wherein the plumbing strap has a plurality of openings at predetermined, equally spaced locations, the peripheral portions of the flange engaging the edges of the openings in the strap.

47. The bracket of claim 46, wherein each of the plurality of openings in the strap have at least one slot extending radially outward from centers of the openings, the slots sized to allow passage of the tab through the slot when the tab is aligned with the slot.

48. A method of restraining tubing using a bracket for holding flexible tubing in a bent configuration, the tubing having an outer diameter, the bracket comprising:
 an inner wall defining a first radius of curvature along an axis of predetermined length and having a first end and an opposing second end;
 an outer wall defining a second radius of curvature in the same plane as the first radius of curvature that is greater than the first radius of curvature by at least the outer diameter of the tubing to be located in the bracket during use of the bracket, at least a portion of the outer wall being located adjacent to at least the first end and the second end of the inner wall to engage sides of the tubing during use of the bracket and to cause the tubing to bend at an angle defined by one of the first and second radii during use of the bracket, the inner wall and the outer wall being connected but providing a slot along at least a substantial length of the inner wall, the slot being sufficiently large to allow the tubing to be inserted through the slot during use of the bracket; and
 a lateral restraint connected to the bracket and extending at least partially across the slot to maintain the tubing in the bracket during use of the bracket;
 the method comprising the steps of inserting the tubing into the bracket through the slot and fastening the bracket to a support structure, and wherein the bracket further includes at least two holes orthogonal to the radius of curvature, and wherein the fastening step comprises the further steps of placing a separate fastener through each of the holes and into a structural support to fasten the bracket to the support.

49. The method of claim 48, comprising the further steps of fastening at least two of said brackets side-by-side with the holes in each of said brackets aligned and placing a fastener through aligned hole of each bracket and into the support.

50. A bracket for holding flexible tubing in a bent configuration, the tubing having an outer diameter, comprising:

an inner wall defining a first radius of curvature along an axis of predetermined length and having a first end and an opposing second end;

an outer wall defining a second radius of curvature in the same plane as the first radius of curvature that is greater than the first radius of curvature by at least the outer diameter of the tubing to be located in the bracket during use of the bracket, at least a portion of the outer wall being located adjacent to at least one of the first end and the second end of the inner wall to engage sides of the tubing during use of the bracket and to cause the tubing to bend at an angle defined by one of the first and second radii during use of the bracket, the inner wall and the outer wall being connected but providing a slot along at least a substantial length of the inner wall, the slot being sufficiently large to allow the tubing to be inserted through the slot during use of the bracket, the angle of the subtended arc between the first and second ends along the second radius being different than the angle of the subtended arc between the first and second ends along the first radius of curvature.

51. The bracket as defined in claim 50 wherein the inner and outer walls are separated by a distance with a lip on at least one of the inner and outer walls extending toward the other wall a distance less than half the distance between walls at the location of that lip to maintain the tubing in the bracket during use of the bracket.

52. The bracket as defined in claim 51, wherein the angle of the arc subtended by the second radius of curvature is greater than the angle of the arc subtended by the first radius of curvature.

53. The bracket as defined in claim 52, wherein the lip is located adjacent at least one of the first and second ends of the outer wall.

54. The bracket as defined in claim 52, wherein the lip is located on the inner wall adjacent a midpoint of the first radius of curvature.

55. The bracket as defined in claim 52, further comprising a flange adjacent the first end of the inner wall and connected to the inner wall and the outer wall, the flange extending outward from the first and second walls in a plane orthogonal to the first radius at the location of the flange.

56. The bracket as defined in claim 52, wherein the first radius of curvature is defined by a series of flat plates.

\* \* \* \* \*